US009094423B2

(12) United States Patent
Atarius

(10) Patent No.: US 9,094,423 B2
(45) Date of Patent: Jul. 28, 2015

(54) APPARATUS AND METHODS FOR INTER-USER EQUIPMENT TRANSFERS

(75) Inventor: Roozbeh Atarius, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 256 days.

(21) Appl. No.: 13/149,639

(22) Filed: May 31, 2011

(65) Prior Publication Data

US 2012/0137008 A1     May 31, 2012

Related U.S. Application Data

(60) Provisional application No. 61/373,731, filed on Aug. 13, 2010, provisional application No. 61/374,234, filed on Aug. 16, 2010, provisional application No. 61/374,980, filed on Aug. 18, 2010.

(51) Int. Cl.
*G06F 15/173*     (2006.01)
*H04L 29/06*     (2006.01)

(52) U.S. Cl.
CPC ........ *H04L 65/1083* (2013.01); *H04L 65/1006* (2013.01); *H04L 65/1016* (2013.01)

(58) Field of Classification Search
CPC ............ H04L 65/1016; H04L 65/1063; H04L 65/1083
USPC ................................... 709/227–229; 370/331
See application file for complete search history.

(56) References Cited

U.S. PATENT DOCUMENTS

| | | | |
|---|---|---|---|
| 2009/0257418 | A1 | 10/2009 | Allen et al. |
| 2010/0312897 | A1* | 12/2010 | Allen et al. ................. 709/227 |
| 2011/0216701 | A1* | 9/2011 | Patel et al. ................. 370/328 |
| 2011/0231553 | A1* | 9/2011 | Patel et al. ................. 709/226 |

FOREIGN PATENT DOCUMENTS

| | | |
|---|---|---|
| CN | 101364874 A | 2/2009 |
| CN | 101370292 A | 2/2009 |
| KR | 20100043073 A | 4/2010 |
| WO | 2010034332 A1 | 4/2010 |

OTHER PUBLICATIONS

3rd Generation Partnership Project; Technical Specification Group Core Network and Terminals; IP Multimedia (IM) Core Network (CN) subsystem inter-UE transfer enhancements; Stage 3 (Release 10), 3GPP Standard; 3GPP TR 24.837, 3rd Generation Partnership Project (3GPP), Mobile Competence Centre ; 650, Route Des Lucioles ; F-06921 Sophia-Antipolis Cedex ; France, vol. I, No. .2.0, Jul. 12, 2010, pp. 1-57, XP050442006, [retrieved on Jul. 12, 2010].

(Continued)

*Primary Examiner* — Chirag R Patel
(74) *Attorney, Agent, or Firm* — Abdollah Katbab

(57) ABSTRACT

A method for identifying an incoming request for an inter user equipment (UE) transfer. The method may include, but is not limited to, any one or combination of receiving an indicator for an inter-UE transfer (IUT) request from a subscription for which a first media and a second media communication session between a first UE and a second UE has been established, the IUT request associated with a third UE using at least one of XML and a media feature tag within a portion of a message request; and routing the IUT request to a service centralization and continuity application server.

43 Claims, 6 Drawing Sheets

(56) References Cited

OTHER PUBLICATIONS

Interdigital Communications et al., Pseudo-CR on how to indicate a request for transfer of collaborative session control, 3GPP Draft; C1-102610, 3rd Generation Partnership Project (3GPP), Mobile Competence Centre ; 650, Route Des Lucioles ; F-06921 Sophia-Antipolis Cedex ; France, vol. CT WG1, No. Dublin; 20100702, Jul. 5, 2010, XP050443297, [retrieved on Jul. 5, 2010].

International Search Report and Written Opinion—PCT/US2011/047684, ISA/EPO—Oct. 21, 2011.

Research in Motion: "IUT Cleanup", 3GPP Draft; C1-102528-24237-930, 3rd Generation Partnership Project (3GPP), Mobile Competence Centre. 650, Route Des Lucioles ; F-06921 Sophia-Antipolis Cedex ; France, vol. CT WG1, No. Dublin; 20100702, Jul. 5, 2010, XP050443236, [retrieved on Jul. 5, 2010].

3rd Generation Partnership Project; Technical Specification Group Services and System Aspects; IP Multimedia Subsystem (IMS) Service Continuity; Inter-UE Transfer enhancements; Stage 2 (Release 10), 3GPP Standard; 3GPP TR 23.831,3rd Generation Partnership Project (3GPP), Mobile Competence Centre; 650, Route Des Lucioles; F-06921 Sophia-Antipolis Cedex; France, No. V1.0.0, Jun. 14, 2010, pp. 1-79, XP050441620.

* cited by examiner

APPARATUS AND METHODS FOR INTER-USER EQUIPMENT TRANSFERS

CROSS-REFERENCE TO RELATED PATENT APPLICATIONS

This application claims priority from U.S. Provisional Application No. 61/373,731, filed Aug. 13, 2010, U.S. Provisional Application No. 61/374,234, filed Aug. 16, 2010, and U.S. Provisional Application No. 61/374,980, filed Aug. 18, 2010, all of which are incorporated herein by reference in their entirety.

BACKGROUND

1. Field of the Disclosure

This disclosure relates generally to apparatus and methods for request identification in a wireless communication system. More particularly, the disclosure relates to an apparatus and method for identifying an incoming request from a different subscription for an inter-user equipment transfer.

2. Relevant Background

In many telecommunication systems, communications networks are used to exchange messages among several interacting spatially separated devices. The various types of networks may be classified in different aspects. In one example, the geographic scope of the network could be over a wide area, a metropolitan area, a local area, or a personal area, and the corresponding networks would be designated as wide area network (WAN), metropolitan area network (MAN), local area network (LAN), or personal area network (PAN). Networks also differ in the switching/routing technique used to interconnect the various network nodes and devices (e.g., circuit switching vs. packet switching), in the type of physical media employed for transmission (e.g., wired vs. wireless), or in the set of communication protocols used (e.g., Internet protocol suite, SONET (Synchronous Optical Networking), Ethernet, etc.).

One important characteristic of communications networks is the choice of wired or wireless media for the transmission of electrical signals among the constituents of the network. In the case of wired networks, tangible physical media such as copper wire, coaxial cable, fiber optic cable, etc. are employed to propagate guided electromagnetic waveforms that carry message traffic over a distance. Wired networks are a static form of communications networks and are typically favored for interconnection of fixed network elements or for bulk data transfer. For example, fiber optic cables are often the preferred transmission media for very high throughput transport applications over long distances between large network hubs, such as, bulk data transport across or between continents over the Earth's surface.

On the other hand, wireless networks are often preferred when the network elements are mobile with dynamic connectivity needs or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. However, usage of wireless propagation requires significant active resource management among the network users and high levels of mutual coordination and cooperation for compatible spectrum utilization.

In one example, wireless networks are compatible with various wireless protocols. Exemplary versions of wireless protocols include Universal Mobile Telecommunications System (UMTS), High Speed Downlink Packet Access (HSDPA), High Speed Uplink Packet Access (HSUPA), Long Term Evolution (LTE), etc. Wireless systems compliant with these protocols are used for various communication services such as telephony, messaging, data transfer, emails, Internet access, audio broadcasts, video communications, etc. These wireless systems generally utilize an access node (AN), also known as base station (BS) or Node B, to connect to an individual access terminal (AT), also known as user equipment (UE) or user device, to fixed telecommunications infrastructure networks. In general, a radio coverage area is implemented using a plurality of Node Bs using a cellular-based topological architecture to provide wireless access, also known as an air interface, to the UEs (e.g., user devices). Examples of fixed telecommunications infrastructure networks include the public switched telephony network (PSTN), Internet, private data networks, etc. In one aspect, the Node Bs may be connected to a Radio Network Controller (RNC) to facilitate the interconnection to the fixed telecommunications infrastructure networks.

SUMMARY OF THE DISCLOSURE

Figure 1:
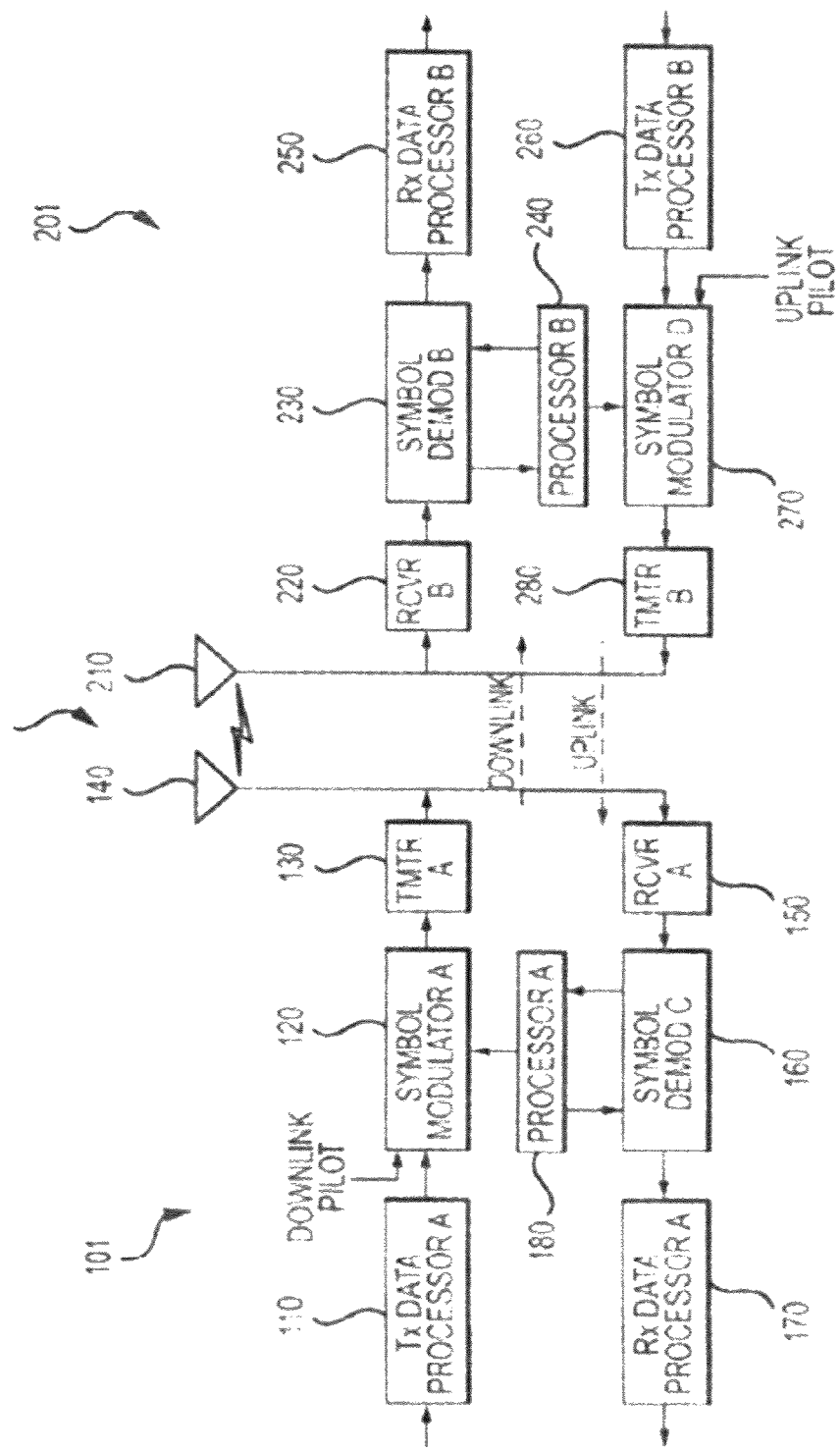
FIG. 1 is a block diagram illustrating an example of a two terminal system.

A method for identifying an incoming request for an inter-user equipment (UE) transfer includes (but is not limited to) any one or combination of: receiving an indicator for an inter-UE transfer (IUT) request from a subscription for which a first media and a second media communication session between a first UE and a second UE have been established; and routing the IUT request to a service centralization and continuity application server (SCC AS). The IUT request is associated with a third UE.

In various embodiments, the IUT request includes extensible markup language (XML) within a header or a body of a message request.

In various embodiments, the IUT request includes a media feature tag within a portion of a message request. In some embodiments, the media feature tag is in a header of the message request. In some embodiments, the portion of the message request comprises a header field. In further embodiments, the header field is a contact header field. In further embodiments, the header field is an accept contact header field.

In various embodiments, the message request is a Session Initiation Protocol (SIP) MESSAGE request. In some embodiments, the SIP MESSAGE request is one of a SIP REFER request or a SIP INVITE request message.

In various embodiments, routing the IUT request comprises routing the IUT request to the SCC AS based on the indicator. In various embodiments, routing the IUT request comprises routing the IUT request to the SCC AS based on the indicator and initial filtering criteria. In various embodiments, routing the IUT request comprises bypassing all other application servers other than the SCC AS. In various embodiments, the IUT request is a request to initiate a replication of the second media to the third UE. In various embodiments, the IUT request is a request to initiate a transfer of the second media to the third UE.

In various embodiments, the method further includes sending a request to the third UE in response to receiving the indicator. In some embodiments, the method further includes: sending a request to the second UE. In some embodiments, the method further includes: sending a request to the third UE to enable one or more ports of the third UE.

In various embodiments, receiving an indicator for an IUT request from a subscription comprises receiving an indicator for an IUT request from a different subscription.

In various embodiments, an electronic device is configured to execute the method.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

FIG. 1 is a block diagram illustrating an example of a two terminal system 100. One skilled in the art would understand that the example two terminal system 100 illustrated in FIG. 1 may be implemented in an FDMA environment, an OFDMA environment, a CDMA environment, a WCDMA environment, a TDMA environment, a SDMA environment, or any other suitable wireless environment.

In one aspect, the two terminal system 100 includes an access node 101 (e.g., base station or Node B) and a user equipment or UE 201 (e.g., user device). In the downlink leg, the access node 101 (e.g., base station or Node B) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol, or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 (e.g., user device) includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 (e.g., user device) includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol, or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 (e.g., user device) is received by antenna 140 and processed by a receiver unit A 150 to obtain samples. In one aspect, the receiver unit A 150 conditions, for example, filters, amplifies, and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station or Node B) and at the UE 201 (e.g., user device), respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the two-terminal system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs (e.g., user devices). In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
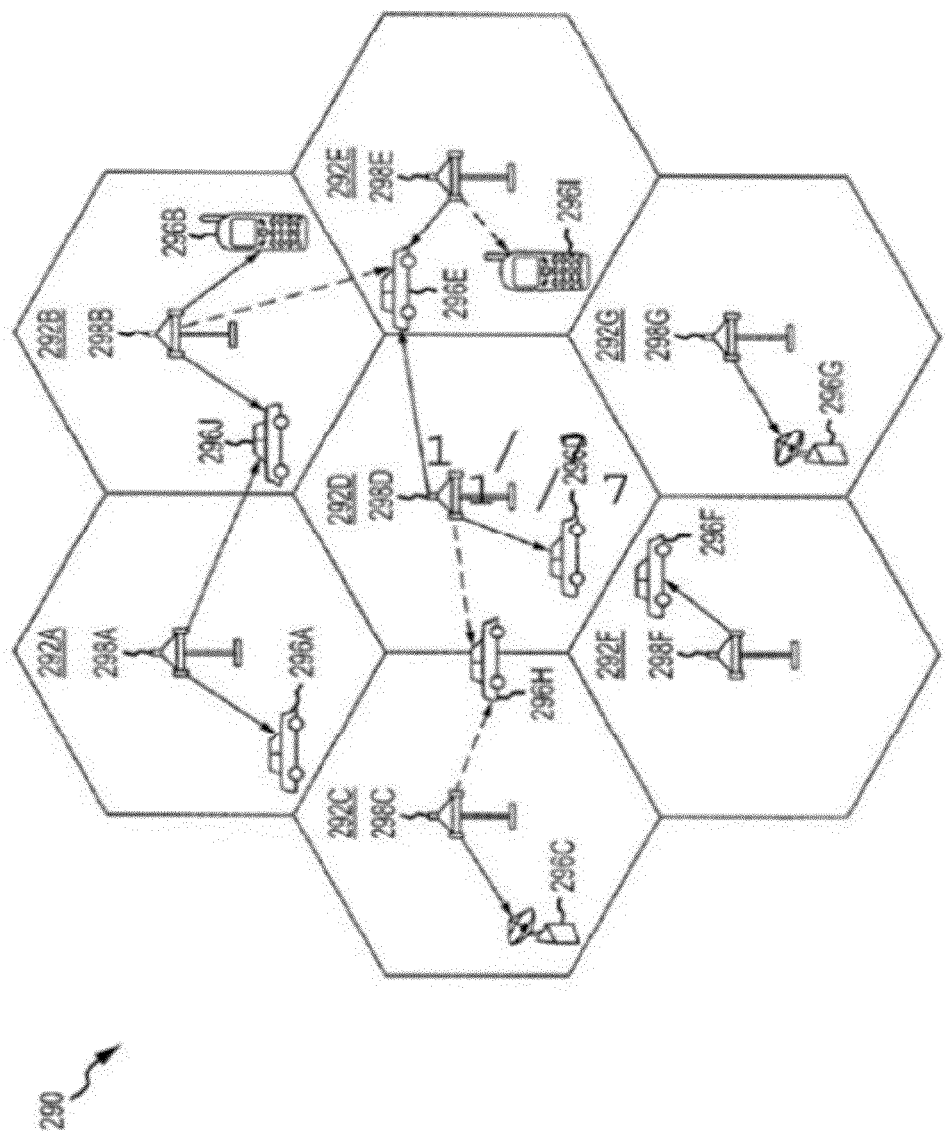
FIG. 2 illustrates an example of a wireless communications system that supports a plurality of user devices.

FIG. 2 illustrates an example of a wireless communications system 290 that supports a plurality of user devices. In FIG. 2, reference numerals 292A to 292G refer to cells, reference numerals 298A to 298G refer to base stations (BS) or node Bs and reference numerals 296A to 296J refer to access user devices (a.k.a. user equipments (UE)). Cell size may vary. Any of a variety of algorithms and methods may be used to schedule transmissions in system 290. System 290 provides communication for a number of cells 292A through 292G, each of which is serviced by a corresponding base station 298A through 298G, respectively.

A protocol used for signaling of multimedia communication among distributed users is known as the Session Initiation Protocol (SIP). In one example, SIP may be used to control multimedia sessions over Internet Protocol (IP) networks. In one aspect, SIP is an application layer protocol, which may operate over a variety of transport protocols.

For a communication system where there is a collaborative session among a controller user equipment (UE), service centralization and continuity application server (SCC AS) and various controlees, all UEs may belong to the same subscription. Therefore, an inter-UE transfer (IUT) operation may be easily distinguished by having a SCC AS address in the Request URI. However, in the release 10 of IUT standardization, the controller UE and the controllee UE may belong to different subscriptions. In this case, the controllee UE is not aware of the address of the SCC AS anchoring the collaborative session. Here, when the controllee UE sends an IUT request (e.g., replication request) to the controller UE, the controllee UE needs to identify the IUT operation to the IMS (IP multimedia subsystem) Core of the domain containing the SCC AS anchoring the session (i.e., the controller UE). Next, the IMS Core routes the request to the SCC AS and bypasses all other application servers, which may prevent those application servers from affecting the request and/or session.

Figure 3:
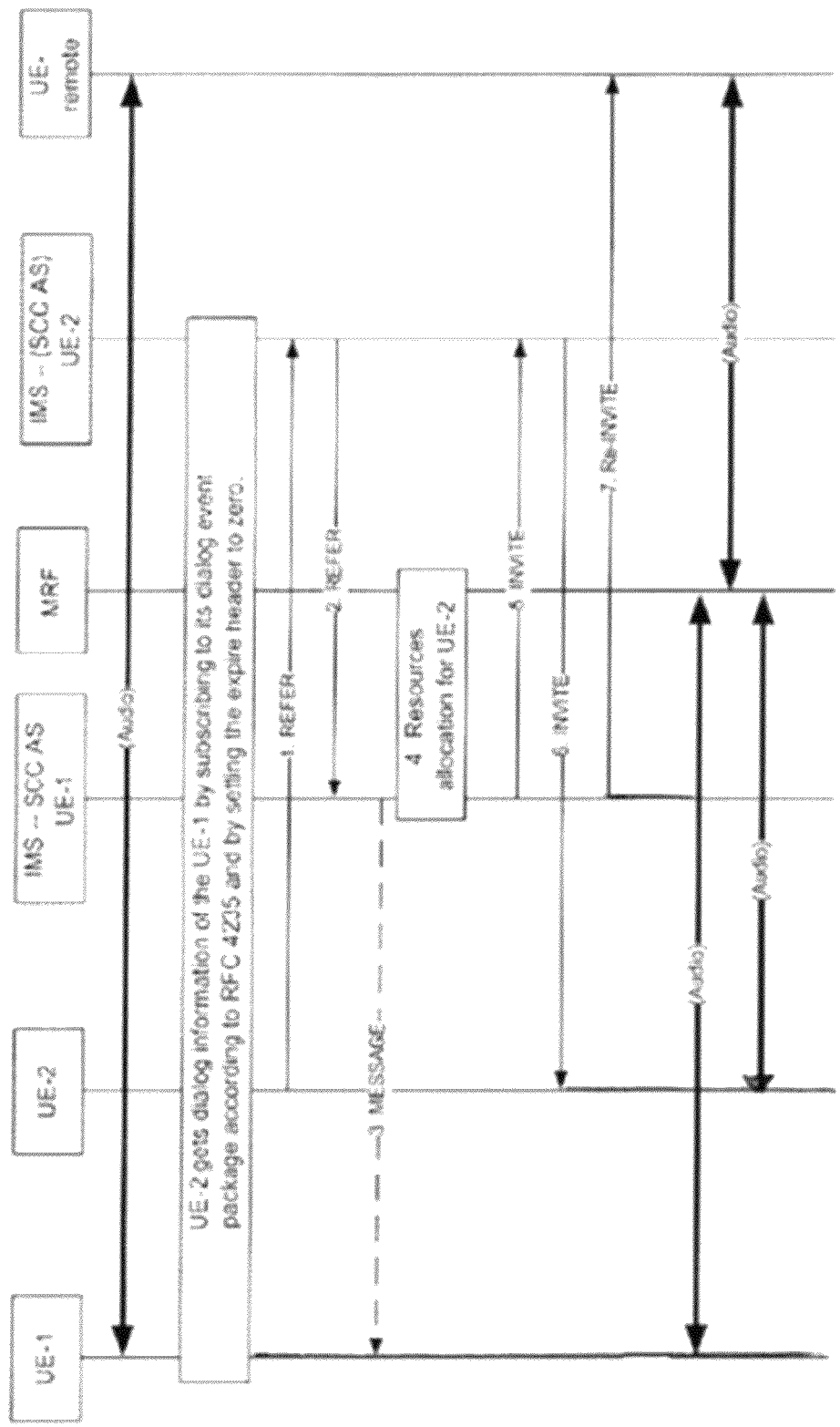
FIG. 3 illustrates an example of a sequence diagram for a replication request.

FIG. 3 illustrates a first UE (UE-1), a second UE (UE-2), a SCC AS for UE-1, a media related function (MRF), a SCC AS for UE-2, and a UE-remote. In one example, an audio communication session between the UE-1 and the UE-remote may be established. In one aspect, the UE-2 obtains dialog information of the UE-1 by subscribing to its dialog event package according to RFC 4235 or the like. In a first step, a SIP REFER message is sent from the UE-2 to the SCC AS for UE-2 to initiate a process for network replication. For example, the Request URI (uniform resource indicator) set to a contact of the UE-1 and a refer-to header field may contain a contact of the UE-2 and the media to be replicated.

In a second step, a SIP REFER message is sent from the SCC AS for UE-2 to the SCC AS for UE-1, (i.e., the domain for the UE-1). Next, a SIP MESSAGE request is sent from the SCC AS for UE-1 to the UE-1, if permission is required. A resource allocation for the UE-2 for session replication may be set up by the SCC AS for UE-1 and the MRF, if permission is granted by the UE-1. Next, a SIP INVITE request message is sent from the SCC AS for UE-1 to the SCC AS for UE-2, which relays the SIP INVITE message to the UE-2. Next, the SCC AS for UE-1 sends a SIP Re-INVITE message to the UE-remote. Finally, the UE-1 provides an audio session to the MRF, which then provides the replicated audio session both to the UE-1 and the UE-remote, such that the UE-2 and the UE-remote have the same session.

In some embodiments, a SIP REFER request message in message 1 is routed to the SCC AS to trigger the entire procedure. In one example, the requirements for this SIP REFER request message are: (1) it needs to be routed to the UE-1 domain, (i.e., the controller UE); (2) Serving Call Session Control Function (S-CSCF) in the domain of the controller UE shall recognize the IUT command to bypass all other application servers as part of or in addition to initial filter criteria (IFC), which may prevent the SIP REFER request from impact in other application servers that may therefore trigger undesired operations, such as inadvertently terminating the session; (3) the SCC AS for the controller UE recognizes the replication command.

According to various embodiments, the above changes to the protocol are in the header (or other suitable portion) of the SIP REFER request (or other suitable request) so the S-CSCF can distinguish the request. In addition, in particular embodiments, the S-CSCF may use the indicator in combination with the IFC to send the request to the appropriate application server(s) (AS).

In some embodiments, Extensible Markup Language (XML) may be used for identifying an incoming request from a different subscription for an inter-UE transfer. In one example, the controllee UE may insert an XML body with a Content-Type header set to XML application as an indicator to the S-CSCF. According to various embodiments, the Content-Type header of application allows for specific application handling. In another example, the body or other suitable portion may include the indicator for the S-CSCF.

In other embodiments, a media feature tag may be used for identifying an incoming request from a different subscription for an inter-UE transfer. In one example, the controllee UE adds a media feature tag to an Accept-Contact header field to indicate the IUT operation to the S-CSCF. In one example, the media feature tag is in the Accept-Contact header field. In one aspect, a media feature tag may be used to identify feature preferences. In another example, the media feature tag is in a Contact header or other suitable portion.

One skilled in the art would understand that although methods implementing XML and media feature tag are specifically described, the present disclosure is applicable to other forms of indication for identifying an incoming request for an inter-UE transfer from a different subscription. For example, the scope and spirit of the present disclosure includes any methods that allow the S-CSCF to recognize the IUT request by getting an indication from a UE. In other words, any indication that allows the S-CSCF to route the IUT request to the appropriate application server, such as a SCC-AS, is within the scope and spirit of the present disclosure.

Figure 4A:
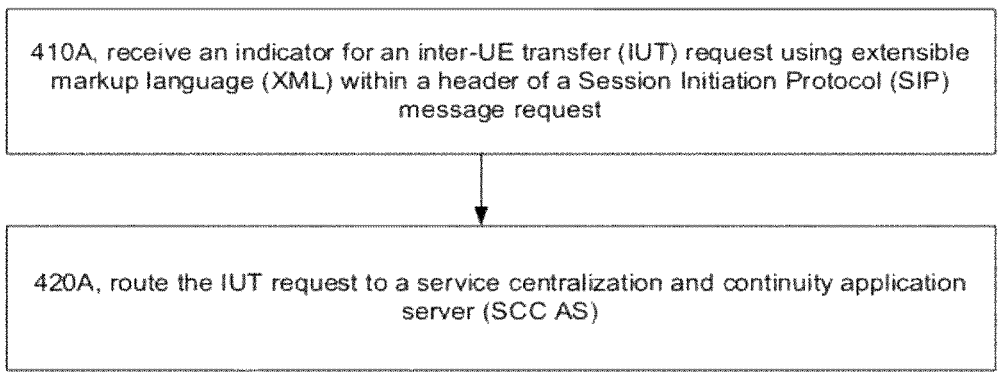
FIG. 4A illustrates an example of a flow diagram for identifying an incoming request for an inter-UE transfer from a different subscription using extensible markup language.
Figure 4B:
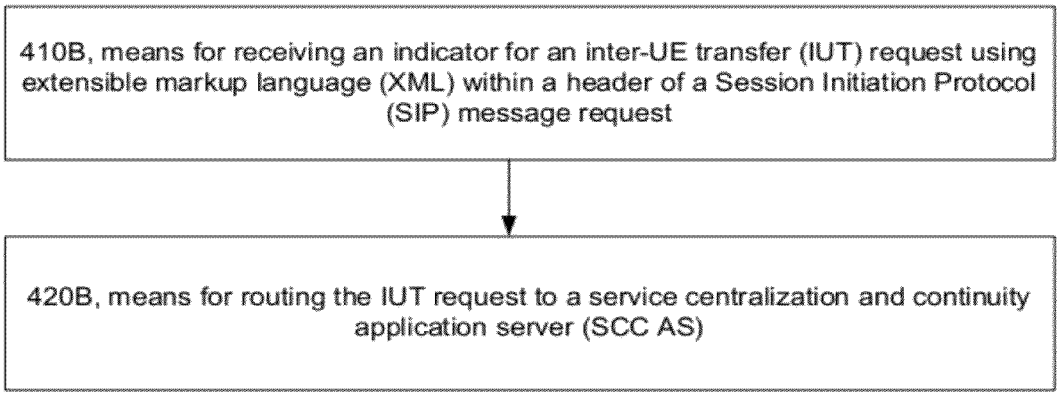
FIG. 4B illustrates an example of a flow diagram for identifying an incoming request for an inter-UE transfer from a different subscription using extensible markup language.

FIGS. 4A and 4B illustrate an example of a flow diagram for identifying an incoming request for an inter-UE transfer from a different subscription using XML. In block 410A (410B), an indicator for an IUT request using XML within a header or body of a Session Initiation Protocol (SIP) message request is received. In one example, the SIP MESSAGE request is a SIP REFER request. Then in block 420A (420B), the IUT request is routed to a service centralization and continuity application server (SCC AS). In other examples, the SIP MESSAGE request may be any suitable message such as (but not limited to) an INVITE (e.g., SIP INVITE) request, a REFER (e.g., SIP REFER) request, a message (e.g., SIP MESSAGE), or the like.

Figure 5A:
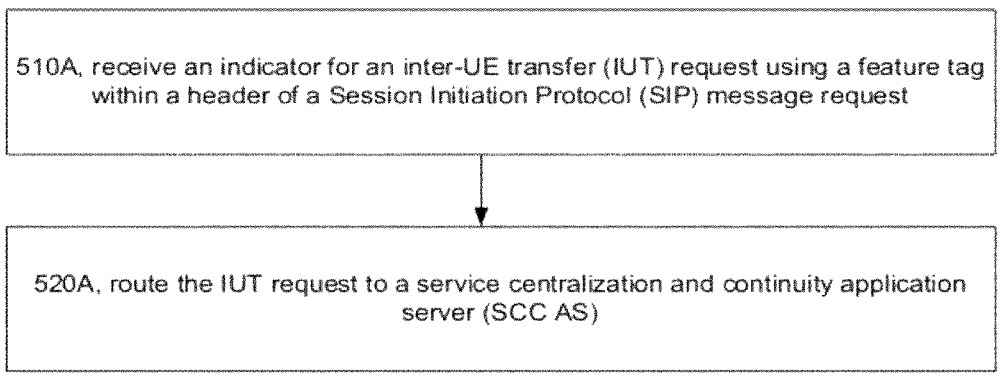
FIG. 5A illustrates a flow diagram for identifying an incoming request for an inter-UE transfer from a different subscription using a media feature tag.
Figure 5B:
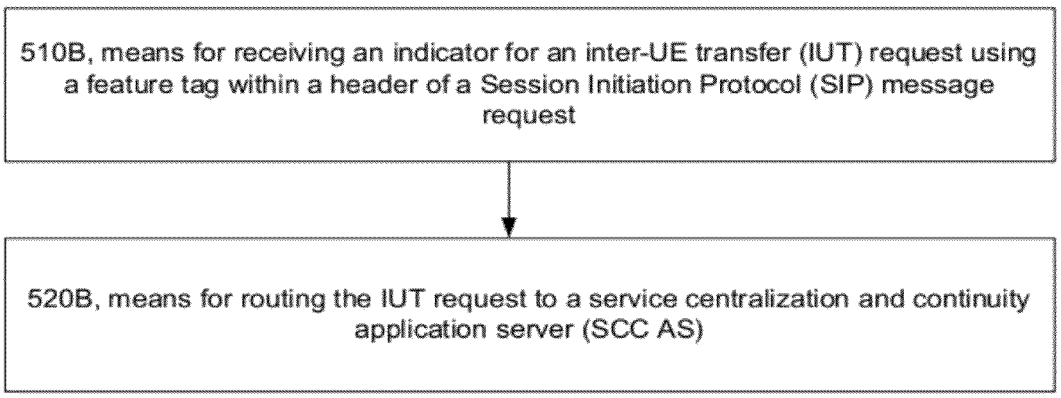
FIG. 5B illustrates a flow diagram for identifying an incoming request for an inter-UE transfer from a different subscription using a media feature tag.

FIGS. 5A and 5B illustrate a flow diagram for identifying an incoming request for an inter-UE transfer from a different subscription using a media feature tag. In block 510A (510B), an indicator for an IUT request using a media feature tag within a portion header of a (e.g., SIP message request is received. In one example, the SIP MESSAGE request is a SIP REFER request. Then, in block 520A (520B), the IUT request is routed to a service centralization and continuity application server (SCC AS). In other examples, the SIP MESSAGE request may be any suitable message such as (but not limited to) an INVITE (e.g., SIP INVITE) request, a REFER (e.g., SIP REFER) request, a message (e.g., SIP MESSAGE), or the like.

Although FIGS. 3-5B are generally discussed in relation to a request for replicating a media session (e.g., audio and/or video), it should be noted that the above is applicable to any suitable request including, but not limited to, requests for transferring sessions, deleting sessions, or the like.

Figure 6:
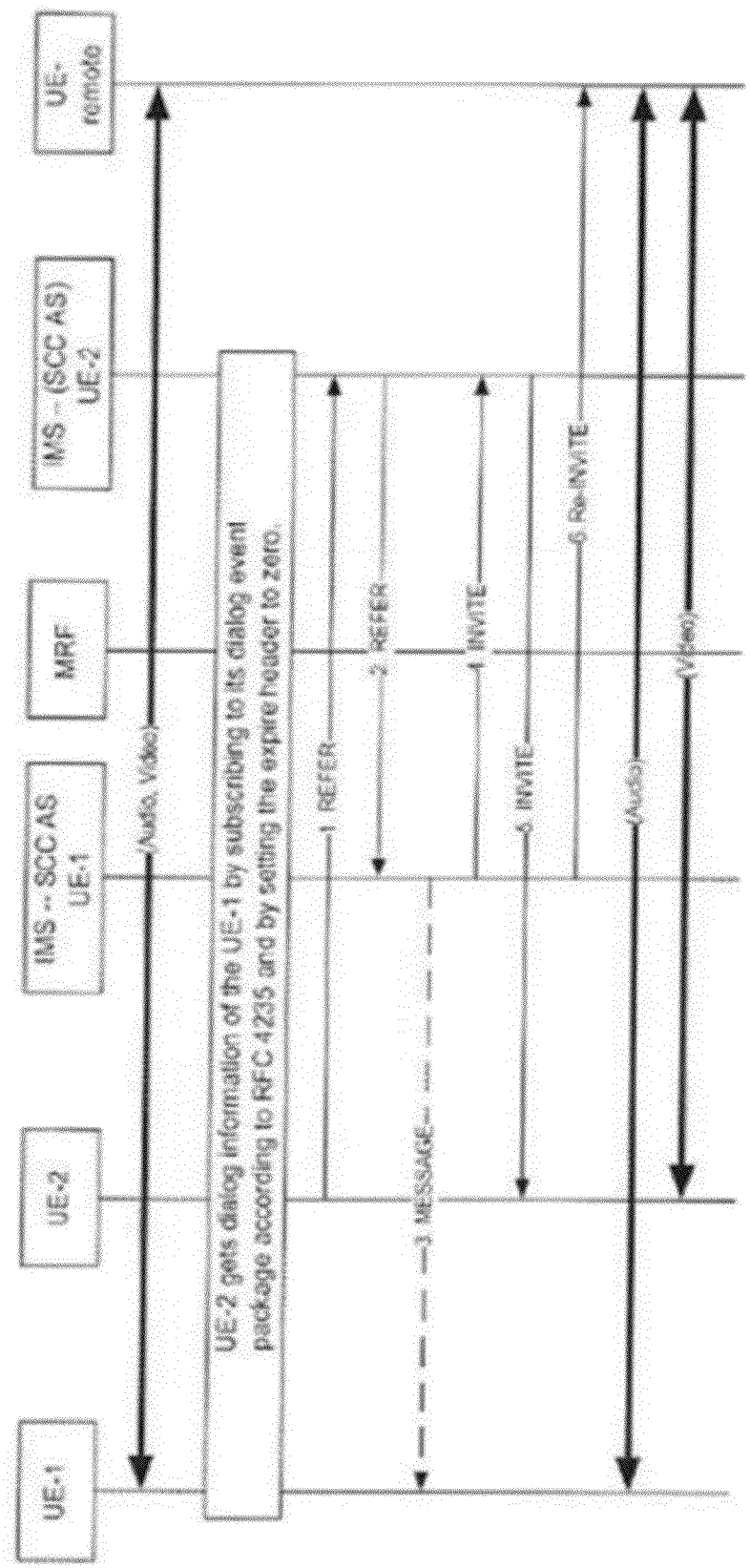
FIG. 6 illustrates an example of a sequence diagram for a transfer request to make a collaborative session.

FIG. 6 illustrates an example of a sequence diagram for a transfer request to make a collaborative session. FIG. 6 illustrates a first UE (UE-1), a second UE (UE-2), a SCC AS for UE-1, a media related function (MRF), a SCC AS for UE-2, and a UE-remote. In one example, a first and a second media (such as an audio and video) communication session between the UE-1 and the UE-remote may be established. The UE-2 obtains dialog information of the UE-1 by subscribing to its dialog event package according to RFC 4235 or the like. In a first step, a SIP REFER message is sent from the UE-2 to SCC AS for the UE-2 to initiate a process for a transfer of the second media (e.g., audio and/or video). For example, the Request URI is set to a contact of the UE-1 and a refer-to header field contains a contact of the UE-2 and the media to be transferred.

In a second step, a SIP REFER message is sent from the SCC AS for UE-2 to the SCC AS for UE-1 (i.e., the domain for the UE-1). Next, a SIP MESSAGE request is sent from the SCC AS for UE-1 to the UE-1, if permission is required. A resource allocation for the UE-2 for session replication transferring may be set up by the SCC AS for UE-1 and the MRF, if permission is granted by the UE-1. Next, a SIP INVITE request message is sent from the SCC AS for UE-1 to the SCC AS for UE-2, which relays the SIP INVITE request message to the UE-2. Next, the SCC AS for UE-1 sends a SIP Re- INVITE request message to the UE-remote. Next, a SIP UPDATE request is sent to the UE-2 to enable ports. Finally, the second media (e.g., audio and/or video) session is now transferred and the session is now a collaborative session among the UE-1, the UE-2, and the UE-remote. As such, for an ongoing multimedia collaborative session between the UE-1 and the UE-remote anchored at the SCC AS for UE-1, the UE-1 may transfer video media or the like to the UE-2, which is a different subscriber, and maintain control of the collaborative session.

Although FIG. 6 is discussed in relation to a request for transferring a media session (e.g., audio and/or video), it should be noted that the above is applicable to any suitable request including, but not limited to, requests for replicating sessions, deleting sessions, or the like.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for identifying an incoming request for an inter-user equipment (UE) transfer, the method comprising:
   receiving, by a second service centralization and continuity application server (SCC AS) associated with a second UE, an indicator for an inter-UE transfer (IUT) request from a subscription for which a first media and a second media communication session between a first UE and a remote UE have been established, wherein the indicator identifies the first UE;
   routing, by the second SCC AS, the IUT request to a first SCC AS associated with the first UE based on the indicator, wherein the IUT request causes the first SCC AS to allocate resources for the second UE for session replication with a media related function (MRF) entity; and receiving, by the second SCC AS, an invite request originating from the first SCC AS in response to the first SCC AS allocating resources for the second UE.

2. The method of claim 1, wherein the IUT request includes extensible markup language (XML) within a header or a body of a message request.

3. The method of claim 1, wherein the IUT request includes a media feature tag within a portion of a message request.

4. The method of claim 3, wherein the media feature tag is in a header of the message request.

5. The method of claim 3, wherein the portion of the message request comprises a header field.

6. The method of claim 5, wherein the header field is a contact header field.

7. The method of claim 5, wherein the header field is an accept contact header field.

8. The method of claim 1, wherein the IUT request comprises a Session Initiation Protocol (SIP) MESSAGE request.

9. The method of claim 8, wherein the SIP MESSAGE request is one of a SIP REFER request or a SIP INVITE request message.

10. The method of claim 1, wherein routing the IUT request comprises routing the IUT request to the SCC AS associated with the first UE further based on initial filtering criteria.

11. The method of claim 1, wherein routing the IUT request comprises bypassing all other application servers other than the SCC AS associated with the first UE.

12. The method of claim 1, wherein the IUT request is a request to initiate a replication of the second media to the second UE.

13. The method of claim 1, wherein the IUT request is a request to initiate a transfer of the second media to the second UE.

14. The method of claim 1, wherein the indicator is configured to cause sending of a request to the first UE.

15. The method of claim 14, the method further comprising:
   sending the invite request to the second UE based on receiving permission to perform the inter-UE transfer from the first UE.

16. The method of claim 15, request is configured to enable one or more ports of the second UE.

17. The method of claim 1, wherein receiving an indicator for an IUT request from a subscription comprises:
   receiving an indicator for an IUT request from a different subscription.

18. An electronic device configured to execute the method of claim 1.

19. A computer program product for identifying an incoming request for an inter-user equipment (UE) transfer, the computer program product comprising:
   a non-transitory computer-readable medium comprising code for:
receiving, by a second service centralization and continuity application server (SCC AS) associated with a second UE, an indicator for an inter-UE transfer (IUT) request from a subscription for which a first media and a second media communication session between a first UE and a remote UE have been established, the indicator identifies the first UE;
   routing, by the second SCC AS, the IUT request to a first SCC AS associated with the first UE based on the indicator, wherein the IUT request causes the first SCC AS to allocate resources for the second UE for session replication with a media related function (MRF) entity; and
   receiving, by the second SCC AS, an invite request originating from the first SCC AS in response to the first SCC AS allocating resources for the second UE.

20. An apparatus for identifying an incoming request for an inter-user equipment (UE) transfer, the apparatus comprising:
   means for receiving, by a second service centralization and continuity application server (SCC AS) associated with a second UE, an indicator for an inter-UE transfer (IUT) request from a subscription for which a first media and a second media communication session between a first UE and a remote UE have been established, wherein the indicator identifies the first UE;
   means for routing, by the second SCC AS, the IUT request to a first SCC AS associated with the first UE based on the indicator, wherein the IUT request causes the first SCC AS to allocate resources for the second UE for session replication with a media related function (MRF) entity; and
   means for receiving, by the second SCC AS, an invite request originating from the first SCC AS in response to the first SCC AS allocating resources for the second UE.

21. An apparatus for identifying an incoming request for an inter-user equipment (UE) transfer, the apparatus comprising:
   a processor; and
   a memory comprising processor executable code and/or data, the processor executable code, when executed by the processor, configures the device to:
      receive, by a second service centralization and continuity application server (SCC AS) associated with a second UE, an indicator for an inter-UE transfer (IUT) request from a subscription for which a first media and a second media communication session between a first UE and a remote UE have been established, wherein the indicator identifies the first UE;
      route, by the second SCC AS, the IUT request to a first SCC AS associated with the first UE based on the indicator, wherein the IUT request causes the first SCC AS to allocate resources for the second UE for session replication with a media related function (MRF) entity; and
      receive, by the second SCC AS, an invite request originating from the first SCC AS in response to the first SCC AS allocating resources for the second UE.

22. A method for identifying an incoming request for an inter-user equipment (UE) transfer from a subscription, the method comprising:
   receiving, from a second UE, by a second service centralization and continuity application server (SCC AS) associated with the second UE, an indicator for an inter-UE transfer (IUT) request, wherein the indicator identifies a first UE;
   routing, by the second SCC AS, the IUT request to a first SCC AS associated with the first UE based on the indicator, wherein the IUT request causes the first SCC AS to allocate resources for the second UE for session replication with a media related function (MRF) entity; and
   receiving, by the second SCC AS, an invite request originating from the first SCC AS in response to the first SCC AS allocating resources for the second UE.

23. The method of claim 22, wherein the IUT request includes extensible markup language (XML) within a header or a body of a message request.

24. The method of claim 22, wherein the IUT request includes a media feature tag within a portion of a message request.

25. The method of claim 24, wherein the media feature tag is in a header of the message request.

26. The method of claim 24, wherein the portion of the message request comprises a header field.

27. The method of claim 26, wherein the header field is a contact header field.

28. The method of claim 26, wherein the header field is an accept contact header field.

29. The method of claim 22, wherein the IUT request is a Session Initiation Protocol (SIP) MESSAGE request.

30. The method of claim 29, wherein the SIP MESSAGE request is one of a SIP REFER request or a SIP INVITE request message.

31. The method of claim 22, wherein routing the IUT request comprises routing the IUT request to the SCC AS associated with the first UE further based on initial filtering criteria.

32. The method of claim 22, wherein routing the IUT request comprises bypassing all other application servers other than the SCC AS associated with the first UE.

33. The method of claim 22, wherein the IUT request is a request to initiate a replication of a session between the first UE and the remote UE to a second UE.

34. The method of claim 22, wherein the IUT request is a request to initiate a transfer a session between the first UE and the remote UE to a second UE.

35. The method of claim 22, wherein the subscription is for a different subscription.

36. An electronic device configured to execute the method of claim 22.

37. A computer program product for identifying an incoming request for an inter-user equipment (UE) transfer from a subscription, comprising:
a non-transitory computer-readable medium comprising code for:
receiving, from a second UE, by a second service centralization and continuity application server (SCC AS) associated with the second UE, an indicator for an inter-UE transfer (IUT) request, wherein the indicator identifies a first UE;
routing, by the second SCC AS, the IUT request to a first SCC AS associated with the first UE, based on the indicator, wherein the IUT request causes the first SCC AS to allocate resources for the second UE for session replication with a media related function (MRF) entity; and
receiving, by the second SCC AS, an invite request originating from the first SCC AS in response to the first SCC AS allocating resources for the second UE.

38. An apparatus for identifying an incoming request for an inter-user equipment (UE) transfer from a subscription, the apparatus comprising:
a processor; and
a memory comprising processor executable code and/or data, the processor executable code, when executed by the processor, configures the device to:
receive, from a second UE, by a second service centralization and continuity application server (SCC AS) associated with the second UE, an indicator for an inter-UE transfer (IUT) request, wherein the indicator identifies a first UE;
route, by the second SCC AS, the IUT request to a first SCC AS associated with the first UE, based on the indicator, wherein the IUT request causes the first SCC AS to allocate resources for the second UE for session replication with a media related function (MRF) entity; and
receive, by the second SCC AS, an invite request originating from the first SCC AS in response to the first SCC AS allocating resources for the second UE.

39. An apparatus for identifying an incoming request for an inter-user equipment (UE) transfer from a subscription, the apparatus comprising:
means for receiving, from a second UE, by a service centralization and continuity application server (SCC AS) associated with the second UE, an indicator for an inter-UE transfer (IUT) request, wherein the indicator identifies a first UE;
means for routing, by the second SCC AS, the IUT request to a service centralization and continuity application server associated with the first UE, based on the indicator, wherein the IUT request causes the first SCC AS to allocate resources for the second UE for session replication with a media related function (MRF) entity; and
means for receiving, by the second SCC AS, an invite request originating from the first SCC AS in response to the first SCC AS allocating resources for the second UE.

40. A method for providing a request for an inter-user equipment (UE) to a subscription, the method comprising:
providing, by a second service centralization and continuity application server (SCC AS) associated with a second UE, an indicator for an inter-UE transfer (IUT) request for which a first media and the second media communication session between a first UE and a remote UE has been established, the IUT request using at least one of XML and a media feature tag to a first SCC AS for the first UE, wherein the IUT request causes the first SCC AS to allocate resources for the second UE for session replication with a media related function (MRF) entity; and
receiving, by the second SCC AS, a request from the first SCC AS for the first UE in response to providing the indicator and in response to the first SCC AS allocating resources for the second UE.

41. The method of claim 40, the method further comprising: obtaining dialog information from the first UE by subscribing to a dialog event package of the first UE.

42. The method of claim 40, the method further comprising: receiving the session from a media related function.

43. The method of claim 40, the method further comprising: receiving a request to enable one or more ports of the second UE.

* * * * *